E. P. LYNCH.
Stalk-Cutters.
No. 153,200.  Patented July 21, 1874.
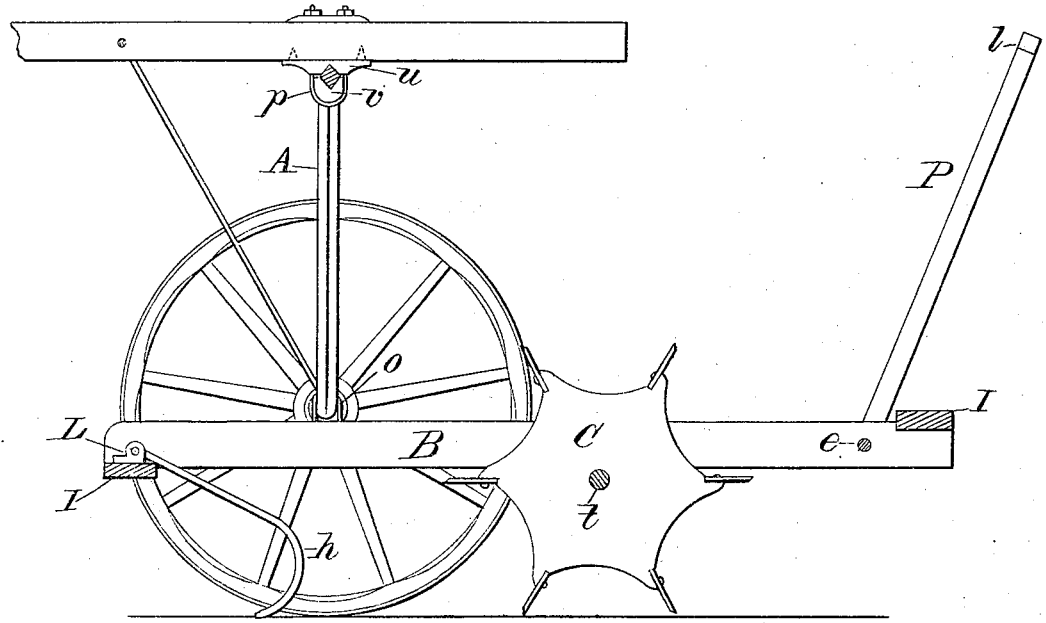
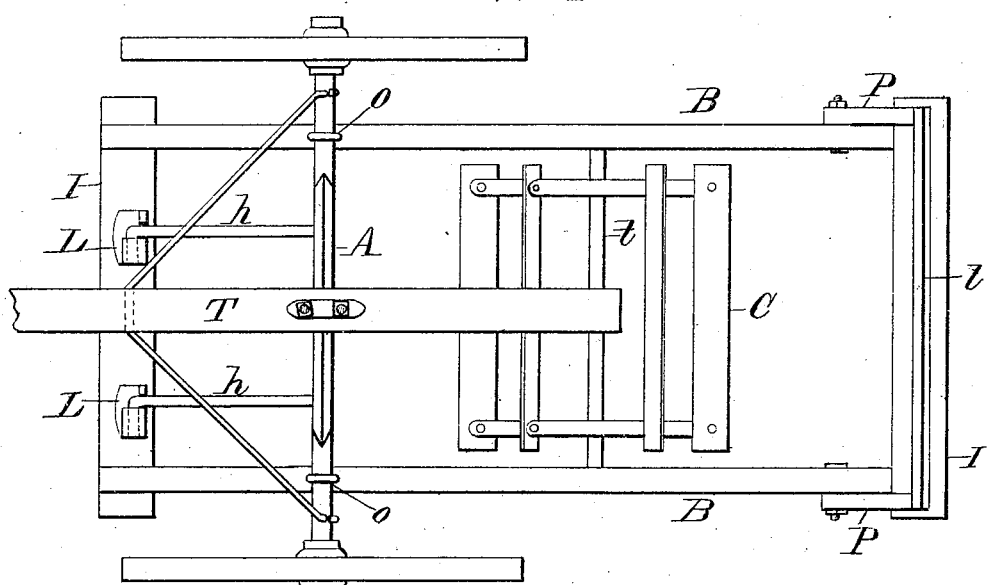
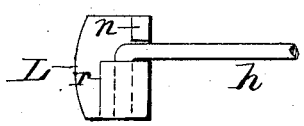
Witnesses:
W. H. Dodge
Harry King
Inventor:
E. P. Lynch,
by Dodge & Son
Attys.

UNITED STATES PATENT OFFICE.

EDWARD P. LYNCH, OF DAVENPORT, IOWA.

IMPROVEMENT IN STALK-CUTTERS.

Specification forming part of Letters Patent No. 153,200, dated July 21, 1874; application filed September 12, 1873.

*To all whom it may concern:*

Be it known that I, EDWARD P. LYNCH, of Davenport, in the county of Scott and State of Iowa, have invented certain Improvements in Stalk-Cutters, of which the following is a specification:

My invention relates to that class of machines or implements which are used for cutting corn-stalks in the field, in order to get them out of the way preparatory to another crop; and the invention consists in a frame hinged to the axle, with its front end projecting forward of the axle, and having the drag-hooks attached thereto; and in mounting the cutting-wheel in said frame, and combining therewith a lever at the rear end, all as hereinafter more fully explained.

Figure 1 is a longitudinal vertical section, showing the implement in elevation. Fig. 2 is a top-plan view. Fig. 3 is a detail view.

To construct my improved machine, I provide an axle, A, preferably arched, though it may be straight; and, in order to obtain the greatest amount of rigidity and strength, I construct the main portion of the axle, or the whole of it, of a rectangular bar of iron, which is bent edgewise, as shown in section in Fig. 1, the lateral arms of the axle either being made round, or being provided with a round shank or part, at the point where the frame is hinged to it. The implement is provided with a tongue, T, which is secured to the axle by means of two metal blocks, $u$ and $r$, having V-shaped recesses in their adjoining faces to fit upon and clasp the axle, as shown in Fig. 1, the plate $u$ having studs or points on it to fit into the wood, as indicated in Fig. 1, the whole being firmly united by a staple or clip, $p$, which incloses the block $r$, and has its ends passed through holes in the block $u$ and the tongue, and also through a plate above, where it is secured by nuts. The tongue is also braced to the arms of the axle by rods, as shown in the drawings. The frame consists of two bars, B, connected at their ends by cross-bars I, and provided at its rear end with a handle or lever, consisting of two uprights, P, united at their upper end by a cross-bar, $l$, this handle being secured at its lower end, by bolts $e$, to the bars B, as shown in Fig. 1, the object of this device being to furnish a means by which the driver can press the cutting-wheel C down upon the ground and the stalks with increased force when necessary. It also serves as a means by which the wheels of the implement or the cutting-wheel can be raised from the ground when desired. The cutting device consists of a shaft mounted in boxes on the under side of the bars B, and having a head with arms on it, to which the blades are attached, this being a device already well known. The frame is attached to the arms of the axle by means of clips $o$, as shown in Figs. 1 and 2, at a point some distance in rear of the front ends of the bars B, so their front ends, with the front cross-bar, shall project in front of the axle, and thus afford a means of attaching the drag-hooks $h$, these hooks being arranged, as usual, to drag on the ground, for the purpose of drawing the stalks in line fore and aft, so as to be in position to be operated upon by the cutter. In order to so attach these drag-hooks that they can be readily attached or detached, I make a plate, L, of the form shown in Fig. 3, it having upon its upper face two lugs, with a recess or space between them wide enough to receive the body of hook, the front end of which is bent at a right angle to fit in a hole made for it in the lug $m$, as shown in Fig. 3. The lug $n$ is so arranged as not to be in front of this hole, but only in line with the rear portion of lug $m$, by which arrangement, as will be readily seen, the hook can be at once detached by simply turning it up far enough to raise it out of the space between the lugs, and then moving it laterally, drawing the bent end out of the hole in the lug $m$, the lug $n$ locking or holding it therein when turned down, as represented in Figs. 1 and 2. By this means a hook, when injured, can be instantly detached and another substituted with but a moment's delay; and it is also a convenient and ready means of attaching them in the manufacture of the implement.

I am aware that agricultural implements have been provided with handles for guiding them, and also that stalk-cutters have been made on which the operator rode, and which were provided with levers to be operated by the feet; but I am not aware that a stalk-cutter was ever before made having the cutting-wheel mounted in a frame pivoted at its front to an axle on wheels, and provided at its rear end with a lever, by which the driver, walking behind the implement, could apply force to the cutting-wheel, as occasion might require.

Having thus described my invention, what I claim is—

1. The combination, in a stalk-cutter, of a frame, B, pivoted to a wheeled axle, with the cutter-wheel journaled directly to the frame in rear of the axle, the front end of said frame projecting in front of the axle, and having the drag-hooks $h$ attached thereto, substantially as described.

2. The combination of the lever P with the frame B, having the cutting-wheel mounted therein, and pivoted at its front to the wheeled axle A, substantially as described.

E. P. LYNCH.

Witnesses:
C. B. CROSS,
A. A. KELLOGG.